United States Patent [19]

Sturner

[11] Patent Number: 4,719,695

[45] Date of Patent: Jan. 19, 1988

[54] PRINTED CIRCUIT BOARD SUPPORT FIXTURE FOR CONNECTOR WIRE WRAP PINS

[75] Inventor: William P. Sturner, Cherry Hill, N.J.

[73] Assignee: RCA Corporation, Princeton, N.J.

[21] Appl. No.: 893,824

[22] Filed: Aug. 6, 1986

[51] Int. Cl.⁴ ........................................ B23P 19/00

[52] U.S. Cl. .................................. 29/760; 29/741; 29/845; 140/147; 269/903

[58] Field of Search ................ 29/842, 760, 844, 845, 29/741; 140/147; 339/17 C; 269/903

[56] References Cited

U.S. PATENT DOCUMENTS

| | | | |
|---|---|---|---|
| 3,154,631 | 10/1964 | Le Mauviel | 339/17 C |
| 4,050,769 | 9/1977 | Ammon | 339/196 M |
| 4,232,929 | 11/1980 | Zobawa | 339/143 R |
| 4,328,613 | 5/1982 | Kirkpatrick | 29/845 X |
| 4,410,230 | 10/1983 | SanMiguel | 339/176 M |
| 4,534,604 | 8/1985 | Peterson | 339/17 D |
| 4,611,399 | 9/1986 | Tavares et al. | 140/147 X |

OTHER PUBLICATIONS

Litton Industries, Inc. Catalog Sheets 28C 00873 and 28C 00870.

"Eurocard Connectors," *AMP Data Sheet* 80-566, Rev. 4-85, pp. 1-2.

Military Specification Sheet MIL-C-55302, Aug. 11, 1980.

"DIN/Eurocard Standards Gain a Foothold In U.S. Industry," by S. Leonard Spitz, *Electronic Packaging & Production,* Feb. 1985, pp. 154-162.

*Primary Examiner*—Howard N. Goldberg
*Assistant Examiner*—Carl J. Arbes
*Attorney, Agent, or Firm*—Clement A. Berard, Jr.; William H. Meise; William Squire

[57] ABSTRACT

A support fixture for a printed circuit board connector having L-shaped wire wrapping pins attached to a printed circuit board includes a plurality of L-shaped elements, each for placement in the L-shaped space defined by adjacent arrays of pins, connector body and printed circuit board. An outer L-shaped structure is juxtaposed with the pins at their bends and with the elements to preclude motion of the pins at their bends in response to wire wrapping forces on the ends of the pins protruding from the printed circuit board.

6 Claims, 2 Drawing Figures

PRINTED CIRCUIT BOARD SUPPORT FIXTURE FOR CONNECTOR WIRE WRAP PINS

Figure 1:
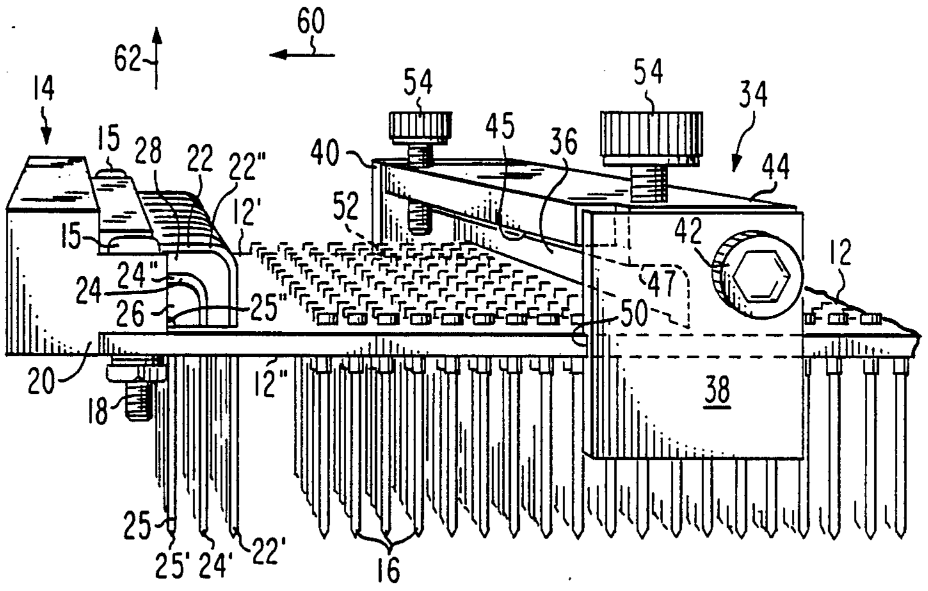

The U.S. Government has rights in this invention pursuant to Contract No. MDA904-84-C-6045.

This invention relates to a fixture for supporting wire wrapping pins of a connector secured to a printed circuit board during the wrapping of wires to the pins.

Pins are secured to printed circuit boards in large arrays for receiving, by the wire wrapping technique, electrical conductors. Because wire wrapping is widely accepted, printed circuit board connectors are available with contact elements which serve as wire wrapping pins. The pins of such connectors are adapted to be passed through apertures in a printed circuit board. Electrical conductors are thereafter wrapped to the protruding connector pins. Those pins are coupled to electrical contacts within the connector body.

Often, connectors are L-shaped so that a slot in the connector for receiving a mating connector element (e.g., a daughter printed circuit board) is coupled to that connector in a plane parallel to the printed circuit board (the mother board). In such connectors, the pins are bent at right angles so that they may pass through the circuit board in a direction normal to the plane of the board and the plane of insertion of the connector mating element. The portions of the pins protruding from the connector body receive wrapped wire and are bent at right angles prior to the pins passing through the board. The extended ends of the connector pins are passed through apertures in the printed circuit board and project beyond the printed circuit board for receiving conductors to be wire wrapped thereto. The connector bodies are usually screwed or otherwise fastened to the printed circuit board.

During wire wrapping electrical conductors to such pins, the pins often tend to bend or otherwise distort in the L-shaped region between the connector body and the location where the pins enter the board. The present inventor believes the cause of the problem for such bending and distortion of the pins is due to lack of support of the pins at the printed circuit board apertures through which the pins pass. Because the pins are L-shaped, the extended legs of the pins which pass through the printed circuit board may receive axial force loads from the wire wrapping tool during the wire wrapping process. Those forces are believed to cause the undesirable distortion in the pins.

According to the present invention, a fixture is provided for supporting exposed L-shaped pin portions extending from a connector body into a printed circuit board first surface in an array. Those pin portions tend to bend and distort in response to a wire wrapping force on the pin portions extending through the printed circuit board. The fixture comprises at least one first cylindrical contact support member adapted to be closely releasably inserted in a generally cylindrical space defined by the L-shaped pin portions, adjacent the connector body and printed circuit board first surface. A second contact support member is releasably secured to the board and is adapted to support the contact L-shaped pin portions at a region thereof external the generally cylindrical space in nested relation thereto.

Figure 2:
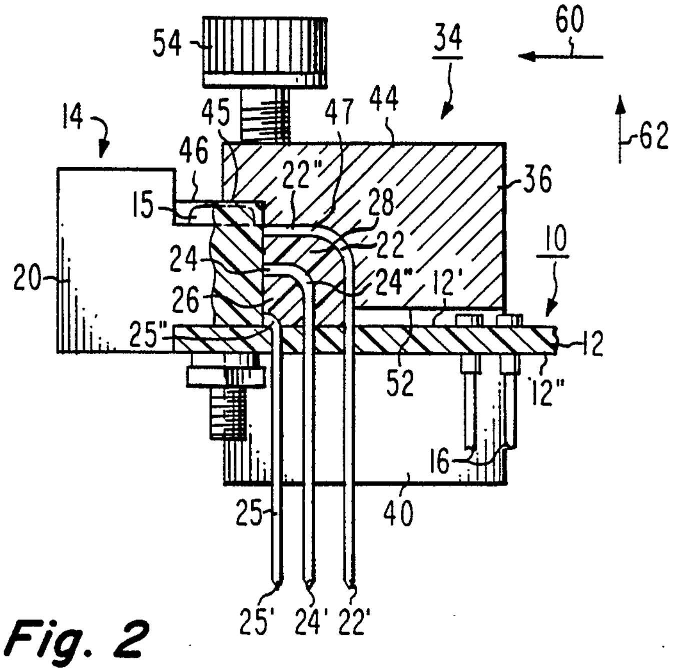

In the drawing:

FIG. 1 is a perspective view of a support fixture in accordance with one embodiment of the present invention coupled to a printed circuit board and connector assembly; and FIG. 2 is an elevation partial sectional view through a fixture in accordance with the present invention assembled in place for supporting the connector pins during wire wrapping.

In FIGS. 1 and 2, printed circuit board assembly 10 comprises a board 12 and a connector 14 secured to board 12 by screws 15. Secured to board 12 is an array of pins 16 shaped for receiving wrapped wire. Board 10 may comprise multi-layers in which various ones of the pins 16 are interconnected among the different layers of the board in a known way.

Connector 14 comprises a thermoplastic body 20, to which three linear arrays 22, 24, and 25 of L-shaped contact pins are secured. The array 24 is nested within array 22 and the array 25 is nested within the array 24. The pins of arrays 22, 24, and 25 are square in cross-section and terminate in body 20 at contacts (not shown). The pins in a typical connector may be staggered or may be aligned in a direction from left to right in the drawing FIGURE.

The pins of arrays 22, 24, and 25 each have legs 22′, 24′, and 25′, respectively, extending through mating apertures in board 12. The legs are arranged in a set of three linearly aligned arrays extending in a direction normal to the plane of drawing, FIG. 2. The legs 22′, 24′, and 25′ extend from board 12 bottom surface 12″ the same length as and are linearly aligned parallel to pins 16.

The arrays 22, 24, and 25 have respective pin portions 22″, 24″, and 25″ in the region between connector body 20 and upper board surface 12′. Portions 22″, 24″, and 25″ tend to distort, bend, twist, and otherwise be damaged upon completion of the wire wrapping process. The distortion and damage to the pins in these regions is believed to be due to forces exerted by the wire wrapping tool (not shown) on the pins; the pins lacking sufficient strength to support such forces.

A fixture according to the present invention tends to minimize such damage. The fixture includes an elongated L-shaped cylindrical element 26, which may be a relatively rigid thermoplastic rod, that is inserted or otherwise located in the L-shaped cylindrical space defined by pin arrays 24 and 25, body 20 and printed circuit board 12 surface 12′. Element 26 abuts arrays 24 and 25, body 20, and board 12. Element 26 is of such dimension and shape in cross-section so as to contact the body 20, printed circuit board 12 and the legs of each pin of the pin portions 24″ and 25″ in the respective arrays 24 and 25 adjacent the right angle bend in the pins in that space. Element 26 is inserted into that L-shaped cylindrical space in a direction into or out of the plane of the drawing.

The legs of pin portions 22″ and 24″ of the respective pin arrays 22 and 24 form a second L-shaped cylindrical space with a portion of connector body 20 and a portion of printed circuit board 12 surface 12′. The L-shaped space defined by the pin portions 24″ and 25″, connector body 20 and board 12 is smaller than and is nested within that second L-shaped cylindrical space. A second L-shaped cylindrical elongated element 28, e.g., a relatively rigid thermoplastic rod, is closely received in that second L-shaped cylindrical space.

Element 28 abuts body 20 at an end of one leg of the element and abuts printed circuit board 12 at the end of the other element leg. Element 28 is juxtaposed with and abuts the legs of pin portions 22″ and 24″. Elements 26 and 28 have the same length into the drawing as the arrays 22 and 24. Element 28 is inserted into its space in a direction into or out of the plane of the drawing FIGURES.

Support structure 34 comprises an L-shaped member having a rear wall 36 forming one leg and top wall 44 forming a second leg of the L. Two upright spaced side walls 38 and 40 are secured to wall 36 at its ends by a pair of screws 42 (only one being shown), FIG. 1. Wall 44 is normal to wall 36 and to side walls 38 and 40. Wall 44 is spaced above board 12 in a plane which is parallel to the plane containing surface 12'. Wall 44 has a shoulder 45 spaced above board 12 surface 12' an amount sufficient to abut surface 46 of connector body 20. Wall 44 has a second shoulder 47 stepped from shoulder 45. The outer surfaces of the legs of pin portions 22" abut shoulder 47 and the facing wall surface of wall 36, the intersection of which is curved to mate with the curve of portions 22". Wall 44 precludes displacement of the pins of array 22 in a direction away from board 12, direction 62.

Side walls 38 and 40 have parallel slots 50 and 52, respectively. Slots 50 and 52 closely slidably receive opposite side edges of board 12. A pair of clamping screws 54 are threaded to wall 44 for clamping structure 34 to board 12. When wall 44 is juxtaposed with the pins of array 22 and abuts connector surface 46, the clamping screws 54 are screwed against board 12. When so clamped the pin arrays 22, 24, and 25, and elements 26 and 28 are nested and locked in abutting relation relative to structure 34 and cannot be significantly displaced in response to wire wrap forces on legs 22' and 24'. That is, the elements 26 and 28, and walls 44 and 36 tightly clamp the nested pins 22, 24, and 25 therebetween, precluding motion in response to wire wrapping forces. Without such motion, the pin portions between body 20 and board 12 are precluded from twisting, bending, and otherwise distorting in response to the wire wrapping forces.

Upon completion of the wire wrapping process, elements 26 and 28 are slid out of their respective cylindrical spaces, screws 54 are loosened and structure 34 is moved off board 12 in a direction opposite direction 60. In this way, structure 34 and elements 26 and 28 do not obstruct wire wrapping of the pins while securing the pins during the wrapping process.

What is claimed is:

1. A fixture for supporting exposed L-shaped pin portions extending from a connector body into and through a printed circuit board first surface in an array, each of said L-shaped pin portions including a first straight pin portion which is substantially orthogonal to said first surface and a second straight portion which is substantially parallel to said first surface, said pin portions tending to bend and distort in response to wire wrapping force on the pins extending through the printed circuit board, said fixture comprising:

at least one first elongated contact support member adapted to be closely releasably inserted into an elongated space defined by the L-shaped pin portions, the adjacent connector body and the printed circuit board first surface, said support member being cylindrical with a cross-section including plural mutually orthogonal flat surfaces for abutting said adjacent connector body and said first surface, said cross-section further including mutually orthogonal further flat surfaces for abutting said first and second straight pin portions; and a second contact support member releasably secured to said board and adapted to support said arrayed L-shaped pin portions at a region external to, and in nested relation with, said elongated space, said second contact support member including a portion axially aligned with said first straight pin portions.

2. The fixture of claim 1 wherein said L-shaped pin portions are aligned in a set of at least two parallel linear arrays, one of said linear arrays defining, in conjunction with said connector body and said board first surface, said elongated space, second one of said linear arrays defining, in conjunction with said one of said linear arrays, said connector body and said board first surface, a second elongated space, said at least one contact support member comprising first and second members.

3. The fixture of claim 1 wherein said second contact support member comprises:

a pair of end members, each including means for slidably closely receiving an edge of said printed circuit board; and an L-shaped support member secured to said end members, one leg of said L-shaped support member being juxtaposed in abutting relation with said first straight pin portions, and the other leg of said L-shaped support member being juxtaposed in abutting relation with said second straight pin portions.

4. A fixture according to claim 1, wherein said cross-section of said elongated contact support member further includes a curved surface smoothly joining said further flat surfaces for abutting those parts of said pin portions between said first straight pin portion and said second straight pin portion.

5. A fixture for supporting arrayed L-shaped pins extending from a connector body into and through a printed circuit board, said fixture comprising:

a first elongated cylindrical element with a generally L-shaped cross-section and adapted to fit in a correspondingly shaped first cylindrical space defined by a first array of said L-shaped pins, portions of a connector body and portions of a printed circuit board surface;

at least one second elongated cylindrical element with a generally L-shaped cross-section and adapted to fit in at least one correspondingly shaped second cylindrical space defined between said first array of said L-shaped pins and an adjacent aligned array of said L-shaped pins, portions of said printed circuit board surface and portions of said connector body, one of said arrays being an outermost array relative to the next adjacent array; and a support structure adapted to be secured to said printed circuit board and juxtaposed with said outermost array, thereby forming a nested combination including said first array of said L-shaped pins, said adjacent aligned array of said L-shaped pins, and said first and second elongated cylindrical elements.

6. The fixture of claim 5 wherein said cross-section of each of said first and second cylindrical elements includes first and second legs, said first and second legs of said second cylindrical element each being sufficiently long to be juxtaposed with the corresponding legs of first cylindrical element in said nested combination, with one of said first arrays of said L-shaped pins and said adjacent aligned arrays of said L-shaped pins located between said first and second cylindrical arrays.

* * * * *